Figure 3:
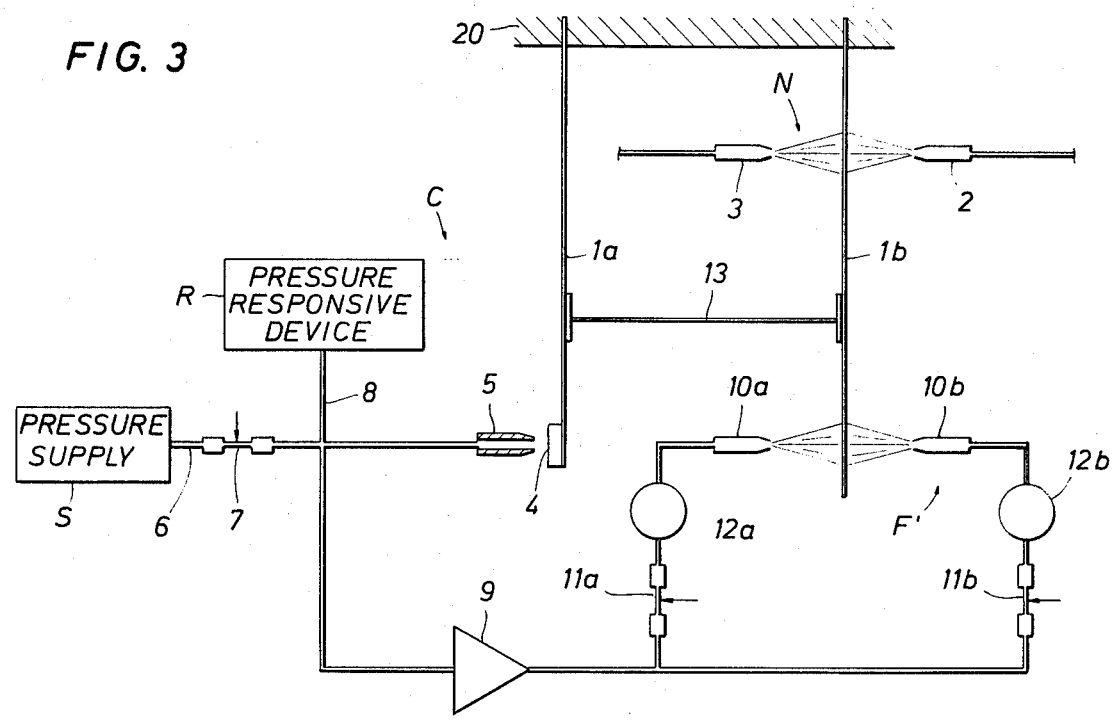

United States Patent [19]
Ducousset

[11] 3,739,798
[45] June 19, 1973

[54] FLUIDIC/PNEUMATIC DEVICES USING EQUILIBRIUM OF FORCES

[75] Inventor: Robert Eugene Raymond Ducousset, Clamart, Hauts-de-Seine, France

[73] Assignee: Compagnie Des Compteurs, Paris, France

[22] Filed: Feb. 18, 1971

[21] Appl. No.: 116,354

[30] Foreign Application Priority Data
Feb. 27, 1970  France .............................. 7007134

[52] U.S. Cl. .................................... 137/85, 137/86
[51] Int. Cl. .......................................... G05d 16/00
[58] Field of Search ................ 137/86, 85, 84, 82, 137/81.5

[56] References Cited
UNITED STATES PATENTS

| 2,737,964 | 3/1956 | Olah | 137/86 |
| 3,543,798 | 12/1970 | Briguglio | 137/81.5 X |
| 2,995,116 | 8/1961 | Doffins | 137/86 X |
| 3,489,176 | 1/1970 | Palmer | 137/85 X |

*Primary Examiner*—Alan Cohan
*Attorney*—William R. Sherman, Jerry M. Presson and Walter C. Forley

[57] ABSTRACT

In the several preferred embodiments of the present invention disclosed herein, a pneumatic controller is provided with a depending flexible vane which is cooperatively arranged and positioned to be moved in relation to a gas-bleed orifice for selectively regulating the pressure of a gaseous control media being supplied to a pressure-responsive control device. To control the movements of the vane, a variable force is applied to the vane to selectively deflect it in response to variations of a measured condition. Proportional feedback is provided in a unique fashion by supplying the regulated gas to one or more nozzles which are arranged to jet gas against the vane for reestablishing the equilibrium of the vane in accordance with the regulated gas pressure.

11 Claims, 5 Drawing Figures

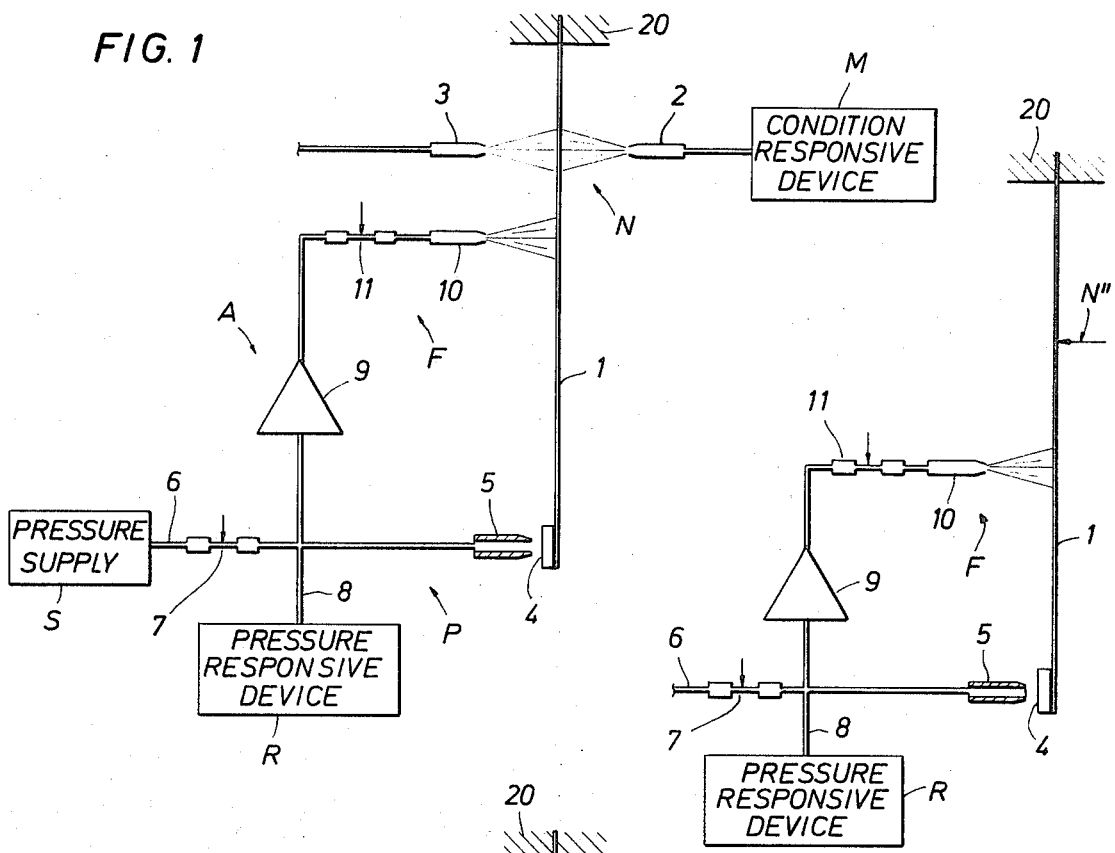
FIG. 1
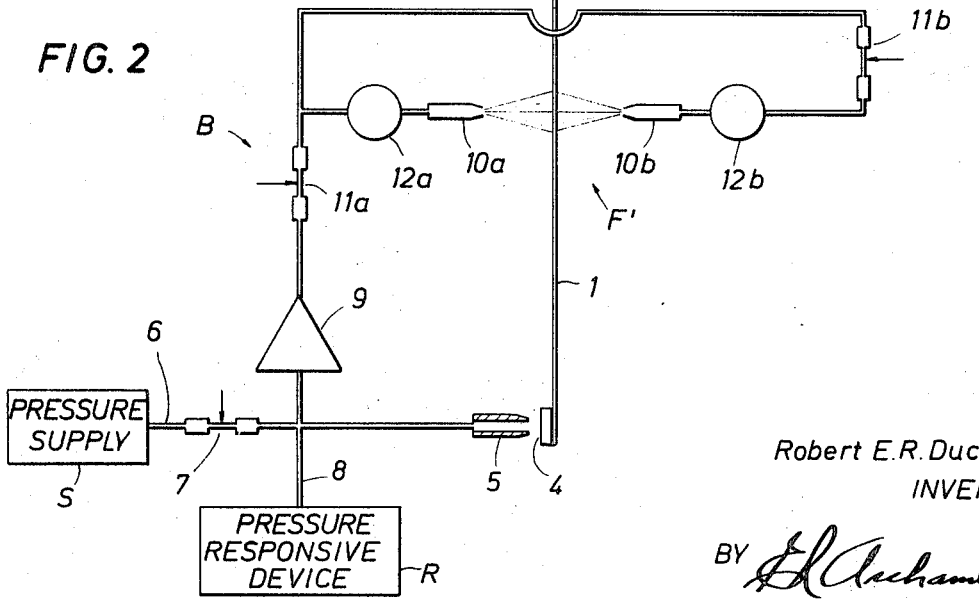
FIG. 2
FIG. 5
Robert E.R. Ducousset
INVENTOR

Robert E.R. Ducousset
INVENTOR

ATTORNEY

FLUIDIC/PNEUMATIC DEVICES USING EQUILIBRIUM OF FORCES

Various pneumatic control systems have been employed heretofore for controlling the operation of pressure-responsive control devices such as diaphragm-control valves or the like. Typically, such control systems are connected to a constant-pressure air source and are cooperatively arranged to selectively vary the pressure supplied to a control device in accordance with changes in a selected measured condition. To vary the pressure applied to the pressure-responsive device, an orifice is placed in the air supply line and a suitable control mechanism is placed downstream of the supply line orifice for controllably bleeding or reducing the pressure of the air being delivered to the control device in accordance with variations of a selected condition sensed by an appropriate measuring instrument.

Generally, such controlled bleeding mechanisms include a sized discharge opening or bleed orifice which, when fully unobstructed, will allow a sufficient quantity of air passing through the discharge orifice to escape to the atmosphere that the pressure applied to the control device will decrease to a predetermined minimum value. On the other hand, it will be appreciated that if the discharge opening is fully obstructed, the air supplied to the control device will readily reach the same pressure as that of the air supply. To selectively vary the pressure applied to the control device between these upper and lower limits, a movable member such as a pivoted flapper is cooperatively arranged in relation to the bleed orifice to move between a position substantially or totally obstructing the discharge opening and a position where the flapper presents little or no obstruction to the escape of air from the outlet opening. Thus, by selectively moving the flapper to various positions within its designated span of travel, the pressure applied to the pressure-controlled device will be correspondingly related to the present position of the movable flapper.

Various actuating mechanisms have been devised heretofore for selectively positioning these movable flappers. Heretofore, these pneumatic control systems have typically employed elaborate and usually delicate linkage mechanisms for mechanically positioning the flapper in response to the controlled movements of a suitable mechanical actuator driven by a condition-sensing device. To provide corrective proportional-band adjustments in these prior control systems, it has been typical to couple the flapper to a second mechanical actuator such as a bellows or a diaphragm which is actuated by the regulated air being supplied to the control device for mechanically re-establishing the equilibrium position of the flapper once it has been moved in response to the measured condition that is then being sensed by the condition-measuring device.

It is, of course, recognized by those skilled in the art that these prior pneumatic control systems pose many operating problems. For example, the response and accuracy of such control systems are directly affected by frictional and inertial losses which are inherent in the linkage mechanisms and various mechanical actuators typically empoyled. Similarly, the bellows or diaphragms usually provided for repositioning such movable flappers introduce marked time lags before the equilibrium of the flapper is re-established. It will also be appreciated that the operation of any of these mechanical components and devices will be impaired should they be exposed to a corrosive enviroment.

Accordingly, it is an object of the present invention to provide new and improved pneumatic control systems adapted for operating pressure-responsive devices, which systems are more responsive in their operation, are less subject to frictional and inertial losses, and are relatively unaffected by exposure to corrosive environments than those systems employed heretofore.

This and other objects of the present invention are attained by a pneumatic control system having an elongated flexible vane which is operatively supported at one end to leave the remaining portion thereof unsupported and free to deflect laterally in response to laterally-directed forces imposed thereon. Pressure-controlling means are adapted for supplying a varying-pressure gas to a pressure-responsive device and include a bleed orifice or discharge opening and opening-restriction means cooperatively arranged for movement relative to the opening in response to the flexural movements of the vance for selectively varying the pressure of the gas supplied to the pressure-responsive device. Pneumatic feedback means are coupled to the pressure-controlling means and include jet means adapted for directing pressured gas laterally against the vane to balance the forces acting on the vane for re-establishing the equilibrium of the control system once the pressure-responsive device has been operated by the pressure-controlling means.

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

FIGS. 1–5 illustrate various embodiments of new and improved pneumatic-control systems respectively incorporating the principles of the present invention.

Turning now to FIG. 1, the pneumatic control system A depicted there is cooperatively arranged for selectively actuating or operating a typical pressure-responsive device R, such as a diaphragm-control valve or the like, in accordance with variations in a selected condition being measured or sensed by a typical condition-responsive measuring device M such as a flow-responsive control, a temperature-measuring device, or a pressure sensor. As is typical, the pneumatic control system A includes pressure-controlling means P connected to a constant-pressure supply S of a suitable gaseous control media, such as compressed air or the like, which is maintained at a constant pressure and adapted for supplying the gas to the pressure-responsive device R at a varying pressure which, as will subsequently be explained, is selectively varied in a unique fashion in accordance with changes in the condition being sensed or measured by the condition-responsive device M. To supply this varying pressure, the pressure supply S is coupled to the pressure-controlling means P which include an inlet gas conduit or tube 6 and an inlet flow control such as a fixed or variable orifice 7 connected to a branched conduit 8 which is, in turn, coupled to the pressure-responsive device R and a typical bleed orifice 5. To vary the pressure of gas in the branched conduit 8, the pressure-controlling means P include a movable closure or an obstructing member 4 adapted for cooperation with the bleed orifice 5 to regulate the rate at which gas is permitted to escape from the bleed orifice.

It will be appreciated, therefore, that the pressure of the gas which is being maintained at any given moment in the conduit 8 by the pressure-controlling means P will be directly dependent upon the rate at which gas in the branched conduit is then escaping to the atmosphere from the bleed orifice 5. For example, if the discharge opening of the orifice 5 is completely obstructed by the closure member 4, the gas pressure in the branched conduit 8 will quickly reach equilibrium at the full pressure of the supply source S once the pressure-responsive device R has attained an operating position corresponding to the pressure in the branched conduit. Conversely, if the outlet opening of the bleed orifice 5 is relatively unobstructed, the continuing discharge of air to the atmosphere will reduce the pressure in the branched conduit 8 to a relatively-low value, the magnitude of which is determined by the degree of restriction provided by the inlet orifice 7 of the pressure-controlling means P. Thus, it will be appreciated that by varying the position of the obstructing member 4 relative to the orifice 5 so as to change the degree of obstruction to the escape of air from the bleed orifice, the pressure in the branched conduit 8 can be selectively regulated by simply controlling the position of the obstructing member.

Accordingly, to selectively vary the position of the obstructing member 4 in relation to the outlet opening of the bleed orifice 5, the obstructing member is mounted on or near the free end of an elongated flexible strip or vane 1 which has its opposite end supported on a convenient mount or a fixed base 20. As illustrated, it is preferred that the vane 1 be dependently supported from the base 20 so as to negate gravitational force which might otherwise tend to deflect the vane. In the preferred embodiment illustrated, the vane 1 is made of a flexible, corrosion-resistant material selected to withstand anticipated environmental conditions in which the pneumatic control system A might be employed.

In the preferred embodiment of the new and improved pneumatic control system A depicted in FIG. 1, the condition-responsive device M is cooperatively coupled to force-application means N uniquely arranged to impose selectively-variable pressure or jetting forces against the vane 1 of sufficient magnitude for laterally deflecting the vane in accordance with changes in the condition being monitored by the condition-responsive device. In this manner, as the vane 1 is selectively deflected, the obstructing member 4 is correspondingly moved laterally over a selected span of movement in relation to the bleed orifice 5 which is proportional to variations of the monitored condition over a selected range of measurements. As illustrated, these lateral forces which vary in response to changes in the condition being monitored by the condition-responsive device M are uniquely provided by cooperatively arranging the condition-responsive device M for producing a continuous flow of compressed gas which proportionally changes as the monitored condition varies and supplying the gas to a suitable nozzle 2 which is suitably oriented for directing a jet of the compressed gas laterally against the rearward face of the flexible vane 1. To provide a more-responsive control of the flexural movements of the vane 1, the force-application means N further include a second nozzle 3 which is co-operatively arranged for directing a continuous unvarying jet of pressured gas against the forward face of the flexible vane 1 for partially offsetting the reaction of the varying jet from the nozzle 2. Although the jet nozzles need not be directly opposed to one another, in the preferred embodiment illustrated, the nozzle 3 is mounted directly opposite the nozzle 2 and cooperatively arranged for imposing a lesser offsetting force of a selected constant magnitude against the forward face of the vane 1. In this manner, the two force-imposing jets respectively issuing from the nozzles 2 and 3 can be accurately adjusted to provide a varying net differential force acting on the vane 1 as dictated by changes in the condition being monitored by the condition-responsive device M.

It will be appreciated, therefore, that as the condition-responsive device M responds to variations in the condition which it is monitoring and correspondingly actuates the jet issuing from the nozzle 2 to deflect the vane 1 to a position which is proprotionally related to the instant magnitude of the monitored condition, the orifice-obstructing member 4 will be accordingly positioned in relation to the discharge opening of the bleed orifice 5 for producing a corresponding pressure in the branched conduit 8. For example, if the condition-responsive device M is cooperatively arranged for developing a maximum lateral jetting force on the vane 1 when the condition being monitored by the condition-responsive device reaches a selected magnitude in a given measurement range, the obstructing member 4 will be urged tightly against the discharge opening of the bleed orifice 5 to allow the pressure in the branched conduit 8 to reach a maximum value. Then, should the monitored condition deviate toward the other extreme of the measurement range of the monitored condition, as the jet issuing from the nozzle 2 imposes a progressively-reduced jetting force on the vane 1, the obstructing member 4 will be correspondingly moved away from the bleed orifice 5 to produce a proportional reduction of pressure in the branched conduit 8.

Those skilled in the art will, of course, appreciate that it is necessary to re-establish the equilibrium of the vane 1 once the pressure in the branched conduit 8 has been equalized following a change in the net differential force imposed on the vane by the force-application means N. Accordingly, in keeping with the pinciples of the present invention, the pneumatic control system A further includes pneumatic feedback means F which are adapted for selectively regulating the lateral positions of the flexible vane 1 in accordance with the pressure of gas which is then being supplied to the pressure-responsive device R.

In the preferred manner of arranging the feedback means F, another branch of the branched conduit 8 is coupled as illustrated in FIG. 1 to a typical pneumatic amplifier 9 having its output in turn coupled to a jet nozzle 10 cooperatively arranged for imposing an offsetting or negative feedback jetting force laterally against the flexible vane 1 which is proportionally related to the net differential condition-responsive force imposed on the vane by the jet nozzles 2 and 3. Accordingly, upon an increase of the jetting force imposed on the vane 1 by the nozzle 2, once the obstructing member 4 has been shifted toward the bleed orifice 5 to produce a correspondingly-increased pressure in the branched conduit 8, a correspondingly-increased negative feedback jetting force will be produced by the jet nozzle 10 for reestablishing establishing the equilibrium of the vane so long as the condition being monitored by the condition-responsive device M remains at its then-present level. Correspondingly, a change in the monitored condition which in turn produces a reduction of pressure in the branched conduit 8 will be accurately followed by a commensurate reduction of the negative feedback force imposed by the jet nozzle 10. To permit fine adjustments of the effective feedback force, the jet nozzle 10 is coupled to the amplifier 9 by flow control means such as a typical variable orifice 11.

Turning now to FIG. 2, an alternative arrangement is shown of a pneumatic control system B which is also arranged in accordance with the present invention. By comparison of FIGS. 1 and 2, it will be realized that the two control systems A and B are identical but for the feedback means F' of the pneumatic control system B. As depicted, the feedback means F' include two jet nozzles 10a and 10b which are mounted in opposition and arranged for imposing laterally-opposed forces on the opposite faces of the vane 1 to provide a selectively-regulated net differential feedback force on the flexible vane. To produce this differential feedback force, the nozzle 10a is coupled to the amplifier 9 downstream of an orifice 11a by a suitable conduit having a second orifice 11b therein which can be varied as required to regulate the jet issuing from the nozzle 10b in relation to the jet from the nozzle 10a.

It will be appreciaited, of course, that the orifices 11a and 11b can be selectively adjusted so that the net differential effect of the opposed jets issuing from the nozzles 10a and 10b will be to produce a negative feedback force which can be as closely regualted as deemed necessary. As an aid for closely adjusting the net feedback force, surge chambers or small gas reservoirs can be installed as illustrated at 12a and 12b in FIG. 2 in the supply conduits between the orifices 11a and 11b and the jet nozzles 10a and 10b. In this manner, by virtue of the additional volumetric capacity of the reservoirs 12a and 12b, a capacitive or storage effect will be provided for smoothing out any fluctuations in the flow of compressed air or gas to the feedback nozzles 10a and 10b.

Turning now to FIG. 3, still another pneumatic control system C incorporating the pinciples of the present invention is depicted. As shown there, it will be appreciated that the control system C is similar to the pneumatic control system B shown in FIG. 2 except that the orifice-obstructing member 4 is mounted on a first flexible vane 1a; and the control nozzles 2 and 3 as well as the feedback nozzles 10a and 10b are cooperatively arranged for selectively positioning a second similar or identical flexible vane 1b. To couple the vanes 1a and 1b together for coordinated movement, a light strut 13 or the like is cooperatively interconnected therebetween so that flexural movement of the vane 1b will produce a corresponding flexural movement of the vane 1a. Otherwise, it will be appreciated that the arrangement as well as the operation of the control system C of FIG. 3 is substantially identical to that of the control system B shown in FIG. 2.

Figure 4:
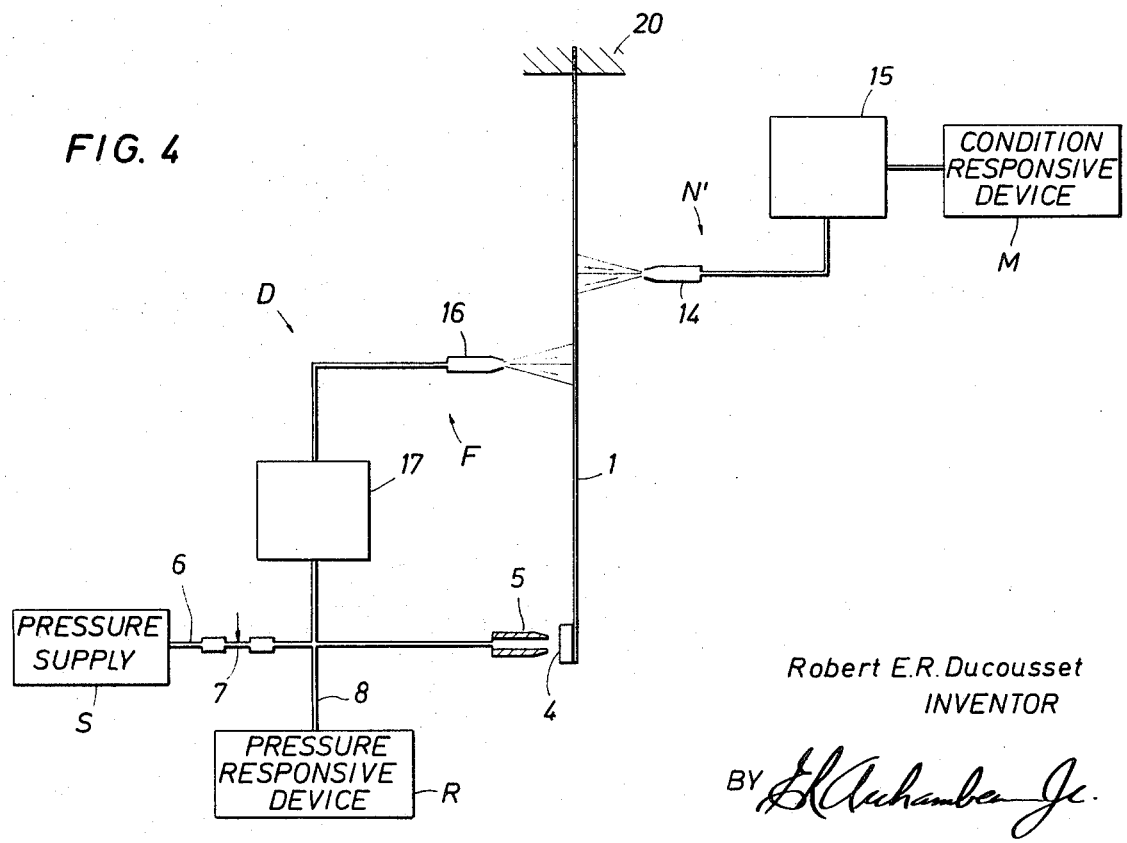

Turning now to FIG. 4, a pneumatic control system D similar to that depicted at A in FIG. 1 is illustrated. As shown in FIG. 4, the pneumatic feedback means F are similar or identical to that depicted in FIG. 1, with the amplifier 9 and regulating orficie 11 being schematically represented as a composite or self-contained control unit 17 which, if desired, may additionally or alternatively further include additional restrictions as at 11 and/or surge chambers as at 12. In any event, the feedback-regulating control unit 17 is cooperatively arranged for supplying the feedback nozzle 16 with pressured gas for developing a negative feedback jetting force on the vane 1 which is proportionately related to the pressure being supplied at that moment to the pressure-responsive device R. Similarly, the force-application means N' may include a composite control unit as at 15 which is arranged for applying pressured gas to only a single force-imposing jet nozzle 14 in accordance with changes or variations in the condition being monitored by its associated condition-responsive device (not shown in FIG. 4). Hereagain, the composite regulating unit 15 may include various arrays of flow restrictions and/or surge chambers and the like to attain a desired total result. It will be appreciated that the operation of the control system D depicted in FIG. 4 will be similar to the system A depicted in FIG. 1 except that the feedback nozzle 16 is used to re-establish the equilibrium of the flexible vane 1 without the aid of a constant reference force such as that supplied by the nozzle 3 (FIG. 1).

Turning now to FIG. 5, still another embodiment of a pneumatic-control system E is depicted which, hereagain, is similar or identical to that shown at A in FIG. 1, except that the condition-responsive monitoring device is designed to produce a mechanical force, as at N'', for laterally moving the flexible vane 1. Thus, by substituting a suitable condition-responsive mechanical force-producing device such as a bimetallic temperature-responsive element, a pressure-responsive diaphragm actuator, or an electromagnetic actuator or solenoid in place of the nozzles 2 and 3, the vane 1 can be selectively deflected back and forth in relation to the bleed orifice 5 as the condition sensed by the force-producing device varies to produce the corresponding changes in the operation pressure supplied to the pressure-responsive device R. It will, of course, be appreciated from the comparision of FIGS. 1 and 5 that the negative feedback forces supplied by the nozzle 10 is either of the two systems A and E will still function in the same manner.

Accordingly, it will be appreciated that the several disclosed embodiments of pneumatic-control systems incorporating the principles of the present invention are each highly responsive to changes in a condition being monitored so as to quickly reestablish the equilibrium of the controlling mechanisms as represented by the depicted flexible vanes. By providing a negative feedback which is constituted by a jet of compressed gas supplied by a pressured source of a motivating gas which is also being applied to a pressure-responsive device controlled, immediate responses will be provided with a minimum of time lag to assure that the control system is quickly restored to an euilibrium condition.

While only particular embodiments of the present invention and modes of practicing the invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A pneumatic control system adapted for operating a pressure-responsive device in response to variations of a selected condition and comprising: a base; an elongated flexible vane having one end fixedly supported on said base and an unsupported free portion adapted for lateral movement in response to laterally-directed forces; pressure-controlling means adapted for connection to a supply of pressured gas for supplying gas at varying pressures to a pressure-responsive device and including orifice means having a discharge opening, opening-restriction means adapted for movement in relation to said discharge opening for selectively regulating the escape of gas therefrom to the atmosphere to vary the pressure of gas supplied by said pressure-controlling means to a pressure-responsive device, and means operatively arranged between said opening-restriction means and said free vane portion and adapted for selectively positioning said opening-restriction means relative to said discharge opening in response to said lateral movements of said free vane portion; condition-responsive means operatively positioned in relation to said vane and adapted for selectively moving said free vane portion to corresponding lateral positions in response to variations of a selected condition; and feedback means adapted for regulating the lateral position of said free vane portion in accordance with the pressure of gas supplied to a pressure-responsive device by said pressure-controlling means and including jet means operatively positioned in relation to said vane and adapted for directing pressured gas laterally against said free vane portion, conduit means operatively arranged and adapted for conducting pressured gas from said pressure-controlling means to said jet means, and flow-control means operatively arranged in said conduit means and adapted for selectively regulating the flow of pressured gas to said jet means to re-establish equilibrium of said vane.

2. The pneumatic control system of claim 1 wherein said flow-control means include orifice means adapted for reducing the pressure of gas supplied to said jet means.

3. The pneumatic control system of claim 2 wherein said flow-control means further include gas-reservoir means adapted for retarding the reduction of gas pressure by said orifice means.

4. The pneumatic control system of claim 1 wherein said flow-control means include pneumatic-amplifier means adapted for proportionally increasing the pressure of gas supplied to said jet means.

5. The pneumatic control system of claim 4 wherein said flow-control means include means adapted for selectively regulating the pressure of gas supplied by said pneumatic-amplifier means to said jet means.

6. A pneumatic control system adapted for operating a pressure-responsive device in response to variations of a selected condition and comprising: a base; an elongated flexible vane fixedly supported from said base and having a depending unsupported free portion adapted to be laterally deflected in response to laterally-directed forces imposed on the opposite faces of said free vane portion; pressure-controlling means adapted for supplying gas at selected pressures to a pressure-responsive device and including first orifice means adapted for connection to a supply of pressured gas, second orifice means fluidly coupled to said first orifice means and having an outlet opening adapted for discharging gas at a controlled rate to the atmosphere, conduit means fluidly coupled between said first and second orifice means and adapted for connection to a pressure-responsive device to supply varying pressure gas thereto, opening-restriction means adapted for movement in relation to said outlet opening for selectively regulating the escape of gas from said conduit means to the atmosphere to control the pressure of gas in said conduit means, and means operatively coupling said opening-restriction means to one face of said free vane portion for selectively moving said opening-restriction means relative to said outlet opening in response to lateral deflections of said free vane portion; means adapted for selectively deflecting said free vane portion and including force-application means adapted for imposing proportionally-variable lateral forces on the other face of said free vane portion in response to variations of a selected condition to move said opening-restriction means to corresponding positions in relation to said outlet opening; and feedback means adapted for re-establishing the equilibrium of said free vane portion in accordance with the pressure of gas in said conduit means and including jet means operatively positioned in relation to said free vane portion and adapted for laterally directing pressured gas thereagainst, and feedback-control means responsive to the pressure of gas in said conduit means for supplying gas at a proportionally-related pressure to said jet means.

7. The pneumatic control system of claim 6 wherein said jet means include a jet nozzle adapted for directing pressured gas against said one face of said free vane portion; and said feedback-control means include passage means between said jet nozzle and said conduit means, and flow-control means in said passage means and adapted for supplying pressured gas to said jet nozzle in proportion to the pressure of gas in said conduit means.

8. The pneumatic control system of claim 6 wherein said jet means include first and second jet nozzles respectively adapted for directing streams of pressured gas against said opposite faces of said free vane portion; and said feedback-control means include first and second passage means between said first and second jet nozzles respectively and said conduit means, and first and second flow-control means in said first and second passage means respectively and adapted for supplying pressured gas to said jet nozzles in proportion to the pressure of gas in said conduit means for developing a net differential feedback force acting on said one face of said free vane portion proportionally opposing said proportionally-variable lateral forces imposed on said other face of said free vane portion by said force-application means.

9. The pneumatic control system of claim 6 wherein said force-application means include a jet nozzle adapted for directing pressured gas against said other face of said free vane portion, and means adapted for supplying pressured gas to said jet nozzle in proportion to variations of a selected condition.

10. The pneumatic control system of claim 6 wherein said force-application means include first and second jet nozzles respectively adapted for directing streams of pressured gas against said one face and said other face of said free vane portion, first means adapted for supplying pressured gas at a constant condition to said first jet nozzle for imposing a constant force against said one face of said free vane portion, and second means adapted for supplying pressured gas to said second jet nozzle in proportion to variations of a selected condition for imposing a varying force against said other face of said free vane portion.

11. The pneumatic control system of claim 10 wherein said varying force is greater than said constant force.

* * * * *